(12) United States Patent
Senelier et al.

(10) Patent No.: US 10,914,460 B2
(45) Date of Patent: Feb. 9, 2021

(54) SYSTEM FOR MOUNTING SURGICAL LIGHTING TO THE CEILING BY MEANS OF PRESSURE SCREWS

(71) Applicant: MAQUET SAS, Ardon (FR)

(72) Inventors: Gregory Senelier, Ardon (FR); David Genevriere, Ardon (FR)

(73) Assignee: MAQUET SAS, Ardon (FR)

( * ) Notice: Subject to any disclaimer, the term of this patent is extended or adjusted under 35 U.S.C. 154(b) by 0 days.

(21) Appl. No.: 16/851,743

(22) Filed: Apr. 17, 2020

(65) Prior Publication Data

US 2020/0248894 A1 Aug. 6, 2020

Related U.S. Application Data

(63) Continuation of application No. PCT/EP2018/079451, filed on Oct. 26, 2018.

(30) Foreign Application Priority Data

Oct. 26, 2017 (FR) ...................................... 17 01116

(51) Int. Cl.
| | |
|---|---|
| *F21S 8/04* | (2006.01) |
| *F21V 21/03* | (2006.01) |
| *F16B 7/18* | (2006.01) |
| *F16B 35/00* | (2006.01) |
| *F21W 131/205* | (2006.01) |
| *F21V 21/02* | (2006.01) |

(52) U.S. Cl.
CPC .............. *F21V 21/03* (2013.01); *F16B 7/182* (2013.01); *F16B 35/005* (2013.01); *F21S 8/043* (2013.01); *F21V 21/02* (2013.01); *F21W 2131/205* (2013.01)

(58) Field of Classification Search
CPC ........ F21V 21/02; F21V 21/03; F16B 35/005; F16B 7/182; F21S 8/043; F21W 2131/205
See application file for complete search history.

(56) References Cited

U.S. PATENT DOCUMENTS

| | | | | |
|---|---|---|---|---|
| 3,766,377 | A | * 10/1973 | Junginger | ............... F21V 29/02 |
| | | | | 362/232 |
| 6,030,103 | A | 2/2000 | Gampe et al. | |
| 6,817,585 | B2 | 11/2004 | Wagner et al. | |

(Continued)

FOREIGN PATENT DOCUMENTS

| | | |
|---|---|---|
| FR | 2876175 A | 4/2006 |
| KR | 101711078 B1 | 3/2017 |

OTHER PUBLICATIONS

International Search Report dated Nov. 20, 2018 for corresponding PCT application No. PCT/EP2018/079451, 6 pages.

*Primary Examiner* — Zheng Song

(57) ABSTRACT

Systems and methods for mounting surgical lighting to the ceiling of an operating theater can include an anchoring tube having attachment holes, and a surgical lighting suspension having internal attachment threads for receiving screws. The receiving screws may be pressure screws. The pressure screws may include a threaded body, and a tightening head which has a smaller diameter than the threaded body. The pressure screws can support and secure the surgical lighting suspension by copressive stress. Anti-loosening screws may be used to secure the pressure screws in place.

20 Claims, 4 Drawing Sheets

(56) References Cited

U.S. PATENT DOCUMENTS

| | | | |
|---|---|---|---|
| 7,726,823 B2* | 6/2010 | Rus | H02G 3/0493 |
| | | | 362/33 |
| 9,022,339 B2* | 5/2015 | Borg | H02G 3/0493 |
| | | | 248/324 |
| 2003/0160142 A1 | 8/2003 | Brahler et al. | |
| 2011/0079697 A1* | 4/2011 | Muller | F21V 27/00 |
| | | | 248/323 |
| 2019/0145473 A1* | 5/2019 | Puterbaugh | A61B 90/50 |
| | | | 188/218 R |

* cited by examiner

SYSTEM FOR MOUNTING SURGICAL LIGHTING TO THE CEILING BY MEANS OF PRESSURE SCREWS

RELATED FILINGS

Benefit and priority are claimed to International application PCT/EP2018/079451, filed Oct. 26, 2018, and to French application FR1701116, filed Oct. 26, 2017. Both are incorporated herein by reference.

BACKGROUND

Mounting systems for attaching surgical lighting to the ceiling of operating theaters typically use cap screws to attach lighting suspensions to an anchoring tube. Screws are often elongated to span a clearance between an anchoring tube from the ceiling and the surgical lighting suspension. The use of elongated screws can contribute to wobbling of the suspension in the anchoring tube. Such systems typically work under tension and the screws can break due to fatigue under heavy loads.

SUMMARY

The present disclosure relates to a system and method for mounting surgical lighting to the ceiling of an operating theater. The system may comprise:
  an anchoring tube for anchoring the surgical lighting to the ceiling of the operating theater, the anchoring tube comprising a plurality of attachment holes;
  a surgical lighting suspension that is suitable for supporting the surgical lighting and for being attached to the anchoring tube, the suspension comprising an attachment portion having a plurality of internal attachment threads; and/or
  a plurality of attachment screws comprising a threaded body and a tightening head, each attachment screw being designed for the threaded body thereof to be screwed into one of the internal attachment threads and for the tightening head thereof to be received in one of the attachment holes.

Some or all of the attachment screws may be pressure screws, rather than cap screws. The pressure screws may attach surgical lighting suspensions to anchoring tubes including by compressive stress. When the mount is in the assembled state, the pressure screws may extend between bores in the anchoring tube and internal attachment threads of the suspension (e.g. attachment threads in flanges). The pressure screws can be compressed downward against bores in the anchoring tube by the weight of the suspension, and by the weight of lighting and/or an arm of the lighting, if present.

By replacing the cap screws with pressure screws, the attachment screws are no longer subjected to flexing tension in the mounted state, but work in pure shear. The screws therefore no longer elongate and it is no longer possible for the screws to break. The mounting system is thus more reliable and more stable.

According to some embodiments, the system according to the disclosure comprises one, several or all of the following features, in all technically possible combinations:
  the threaded body of each pressure screw has a left-handed thread;
  the diameter of the tightening head of each pressure screw is smaller than the diameter of the threaded body, so as to define a bearing shoulder at the interface between the tightening head and the threaded body;
  an anti-loosening screw for each pressure screw is used for preventing the pressure screw from being loosened in the mounted state;
  an internal thread is provided in the tightening head of each pressure screw, the internal thread being suitable for accommodating one of the anti-loosening screws;
  a protective cap is provided for each anti-loosening screw, the protective cap being in particular provided with a washer and/or a flap for closing the cap;
  the surgical lighting suspension comprises an attachment shaft and a flange that is secured to and encompasses the attachment shaft;
  the flange comprises the plurality of internal attachment threads in respective passages that are provided in the flange;
  the attachment shaft comprises an elongate pipe that is suitable for being positioned at least partially in the anchoring tube;
  the suspension comprises an attachment shaft and a plurality of flanges that are secured to the attachment shaft and arranged so as to be mutually spaced along said attachment shaft; and/or
  the flanges each comprise a plurality of internal attachment threads.

The disclosure also relates to a mount for hooking surgical lighting onto the ceiling of an operating theater, the mount being an assembly of the mounting system defined above, in which assembly the attachment portion of the surgical lighting suspension is inserted into the anchoring tube and attached to said tube by means of the pressure screws, each pressure screw being tightened in compression against the anchoring tube.

Most preferably, each attachment hole can accommodate a tightening head and an anti-loosening screw that is screwed into the tightening head. In this case, each attachment hole can also accommodate a protective cap that accommodates the tightening end of the anti-loosening screw.

The mount can further comprise one, several or all of the following features, in all technically possible combinations:
  the pressure screws are oriented radially outward relative to the surgical lighting suspension;
  the pressure screws each extend between an attachment hole in the anchoring tube and an internal attachment thread in the surgical lighting suspension;
  the pressure screws thus prevent lateral or rotational movement of the suspension relative to the anchoring tube and are capable of at least partially supporting the suspension weight of surgical lighting; and/or
  each anti-loosening screw has a threaded end that is screwed into an internal thread of the pressure screw thereof in order to thus lock the pressure screw in position, and a head that has a diameter larger than that of the threaded end and is positioned in a counterbore of one of the attachment holes in the anchoring tube.

The present disclosure also relates to a unit comprising a mount as defined above and surgical lighting, the surgical lighting optionally comprising an articulated arm by means of which the lighting is hooked onto the suspension.

The disclosure also relates to methods for assembling a mount as defined above, comprising some or all of the steps of:
  a) screwing each pressure screw fully inside one of the internal attachment threads of the surgical lighting suspension so as to conceal the pressure screws completely inside the surgical lighting suspension;

b) inserting the attachment portion of the surgical lighting suspension into the anchoring tube until the internal attachment threads are in line with the attachment holes;

c) engaging a screwing tool with a tightening head of a pressure screw by inserting the screwing tool into an internal attachment thread while passing through the associated attachment hole;

d) unscrewing the pressure screw by means of the screwing tool until said tool bears and is compressed against the anchoring tube; and/or e) repeating steps c) and d) for each pressure screw in order to compensate for any clearance between the surgical lighting suspension and the anchoring tube;

The method optionally comprises the additional steps of:

f) placing a protective cap in each attachment hole;

g) screwing an anti-loosening screw into each tightening head by means of the protective cap; and/or h) placing a flap on the protective cap in order to conceal the anti-loosening screw.

DRAWINGS

The disclosure will be better understood by considering the following detailed and non-limiting description, with reference to the appended drawings, in which.

DESCRIPTION

Figure 1:
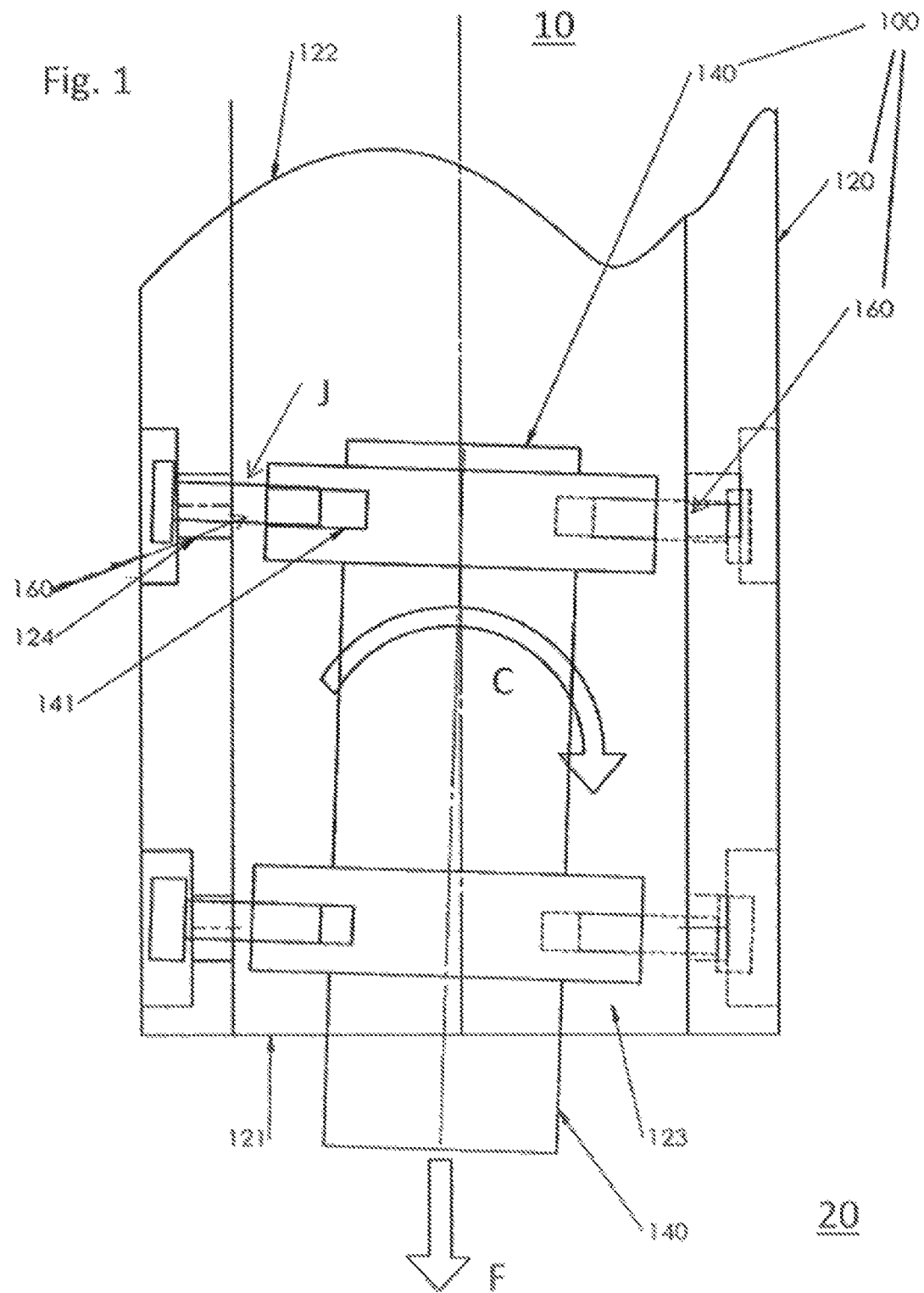
FIG. 1 is a view in longitudinal section of a system for mounting surgical lighting according to the prior art.

FIG. 1 shows a known system 100 in the mounted state when it is used for attaching surgical lighting to the ceiling of an operating theater.

The system 100 comprises an anchoring tube 120, a surgical lighting suspension 140 and six attachment screws 160, of which only four screws are shown. The anchoring tube 120 is arranged in the ceiling 10 of a room 20 of an operating theater. The anchoring tube 120 is hollow. Said tube has a passage 121 that opens into an upper end 122 on the ceiling 10 side and into a lower end 123 on the room 20 side. The anchoring tube 120 is provided with six attachment holes 124, each accommodating one of the attachment screws 160.

The surgical lighting suspension 140 is inserted into the passage 121. Said suspension has six internal attachment threads 141. The attachment screws 160 are screwed into the internal attachment threads 141. The surgical lighting suspension 140 is thus attached to the anchoring tube 120.

The attachment screws 160 are cap screws. Said screws therefore work under tension and can break due to fatigue when used with heavy loads.

More specifically, when applying a considerable force F (cf. arrow in FIG. 1) to the surgical lighting suspension 140, the clearance J between the surgical lighting suspension 140 and the anchoring tube 120 means that the surgical lighting suspension 140 can oscillate in the tube 120 (cf. arrow C in FIG. 1). In this way, the screws 160, which are sized for shear force, are elongated. This causes the suspension 140 to wobble in the tube 120. The clearance in the surgical lighting suspension 140 is distracting for the operating staff. The operating staff therefore call a maintenance operator to remove the clearance J. The operator thinks that the clearance J is due to the screws 160 being loosened. Said operator therefore tries to retighten the screws, which causes the screws to break.

One aim of the disclosure is therefore that of improving this known mounting system. In particular, this involves providing a system for mounting surgical lighting in a more reliable and stable manner.

According to the disclosure, this aim is achieved by means of a system as defined herein, in which each attachment screw is preferably a pressure screw provided for attaching the surgical lighting suspension to the anchoring tube by means of compressive stress.

Figure 2:
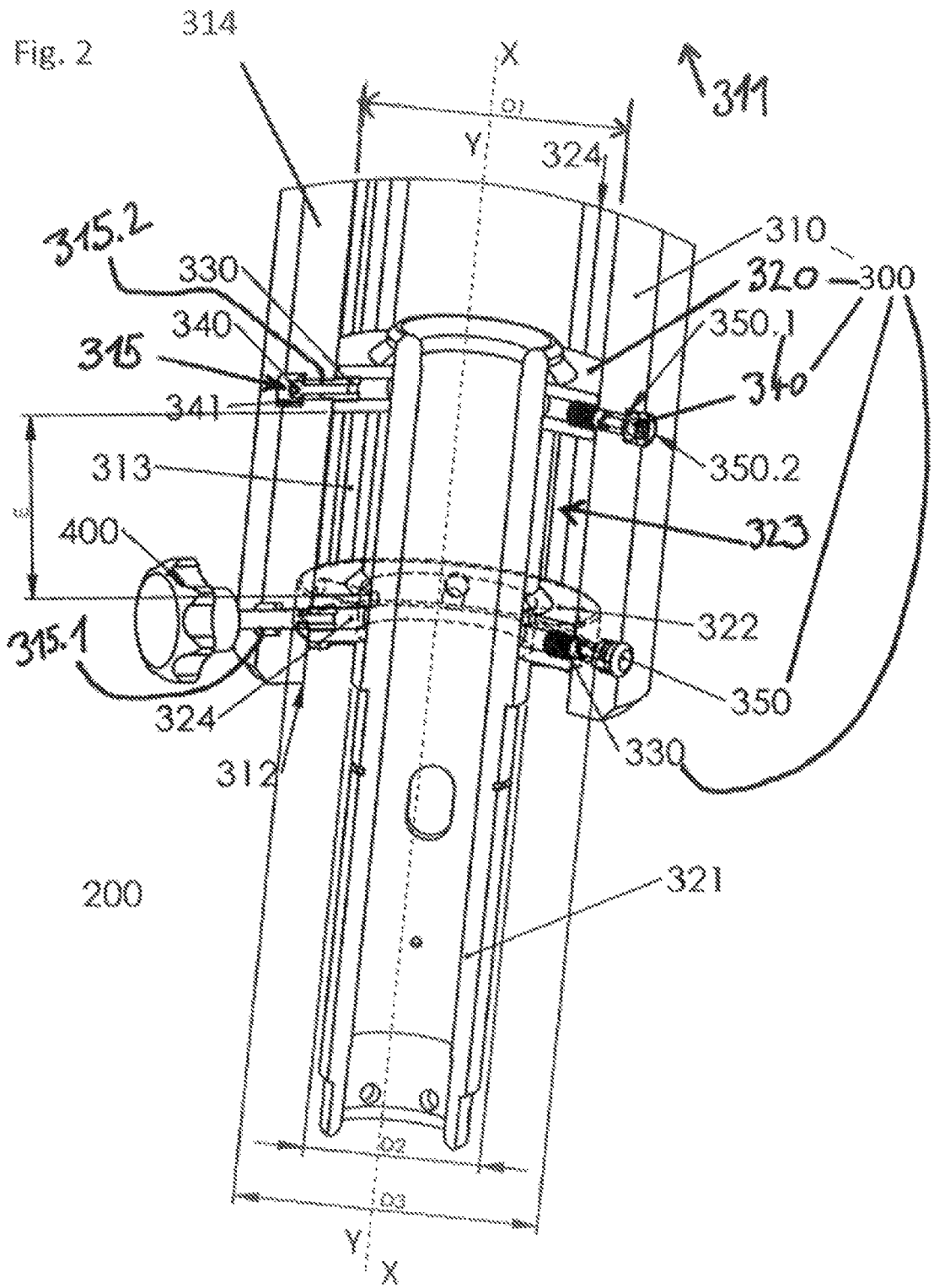
FIG. 2 is a perspective view in longitudinal section of a system for mounting surgical lighting according to the disclosure, which system is being assembled to form a mount for hooking surgical lighting onto the ceiling of an operating theater.

FIG. 2 is an overview of a mount 200 according to the disclosure in a partially assembled state. The mount 200 is assembled from a mounting system 300. The mounting system 300 is a set of detached parts. Said system comprises an anchoring tube 310, a surgical lighting suspension 320 and a plurality of attachment screws 330.

The anchoring tube 310 is provided in order to be secured to the ceiling of an operating theater. For this purpose, said tube has an upper anchoring end 311. Said tube also comprises a lower insertion end 312. A cavity 313 extends between the two ends 311 and 312. This cavity is delimited by a cylindrical wall 314. The anchoring tube 310 has a main longitudinal axis X-X and an internal diameter D1.

The cylindrical wall 314 is provided with a plurality of attachment holes 315. Each attachment hole 315 passes through the cylindrical wall 314 radially. In this instance, there are six attachment holes which are arranged in two groups of three (FIG. 2 only shows two of the six holes). The three attachment holes 315 of one group are located axially at the same height. Said holes are distributed, in particular equidistantly, along the circumference of the cylindrical wall 314. The two groups of three are mutually spaced along the main axis X-X of the anchoring tube 310. It should be noted that it is, of course, possible to envisage another number of attachment holes 315 which can be grouped differently on the cylindrical wall 314.

Each attachment hole 315 may have a counterbore 315.1. Said counterbore is located on the external side of the cylindrical wall 314. Each counterbore 315.1 leads into a bore 315.2 which in turn leads into the cavity 313.

The surgical lighting suspension 320 comprises an attachment shaft 321 having an external diameter D2 that is smaller than the internal diameter D1 of the anchoring tube 310. The shaft 321 has a main longitudinal axis Y-Y which, in the mounted state, coincides with the axis X-X of the anchoring tube 310. The surgical lighting suspension 320 may further comprise two flanges 322 which encompass the attachment shaft 321. The flanges 322 can in particular be secured to the attachment shaft 321, for example by welding. Of course, providing only a single flange 322 is conceivable. The two flanges 322 are mutually separated by a distance E along the axis Y-Y. The external diameter D3 of the flanges 322 is substantially equal to the internal diameter D1 of the anchoring tube 310. The flanges 322 together define an attachment portion 323 of the surgical lighting suspension 320 to the anchoring tube 310. Each flange 322 is provided with a plurality of internal attachment threads 324. Each flange 322 can in particular have three internal attachment threads 324 (FIG. 2 only shows one internal thread 324 for each flange 322). The internal threads 324 are distributed, in particular equidistantly, along the circumference of the associated flange 322. The internal threads 324 are each intended to be opposite a hole 315 when in the mounted state, as seen in FIG. 2.

Figure 3:
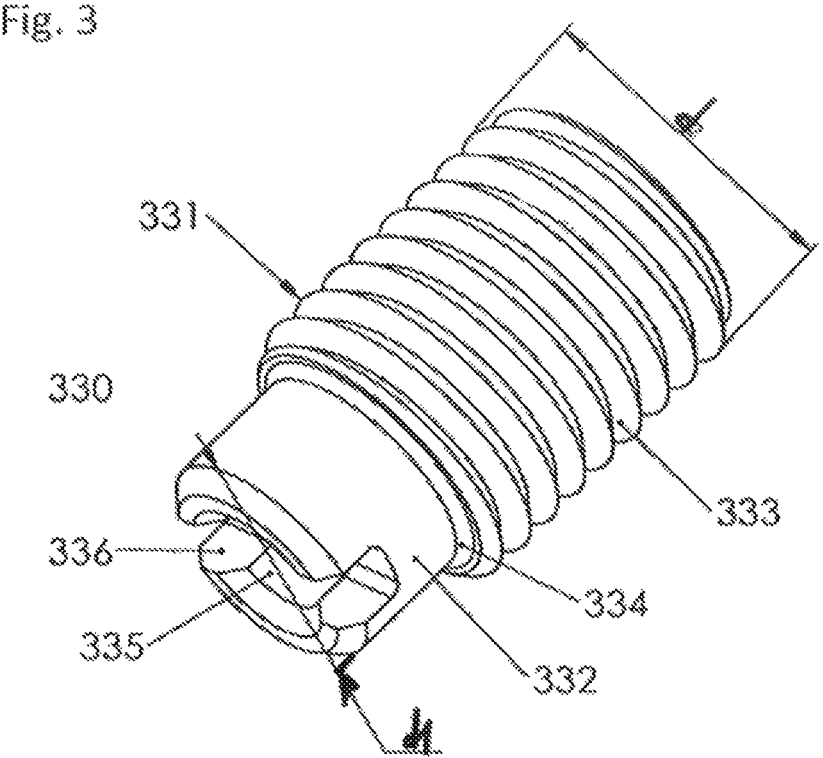
FIG. 3 is a perspective view of a pressure screw used in the mounting system of FIG. 2.

According to the disclosure, the attachment screws 330 are preferably pressure screws. FIG. 3 shows an exemplary pressure screw 330 in detail. Each pressure screw 330 comprises a threaded body 331 and a tightening head 332. The threaded body 331 of each pressure screw 330 can in particular have a left-handed thread 333.

In addition, the diameter d1 of the tightening head 332 of each pressure screw 330 is preferably less than the diameter d2 of the threaded body 331, so as to define a bearing shoulder 334 at the interface between the tightening head 332 and the threaded body 331.

An internal thread 335 can be provided in the tightening head 332 of each pressure screw 330.

Figure 4:
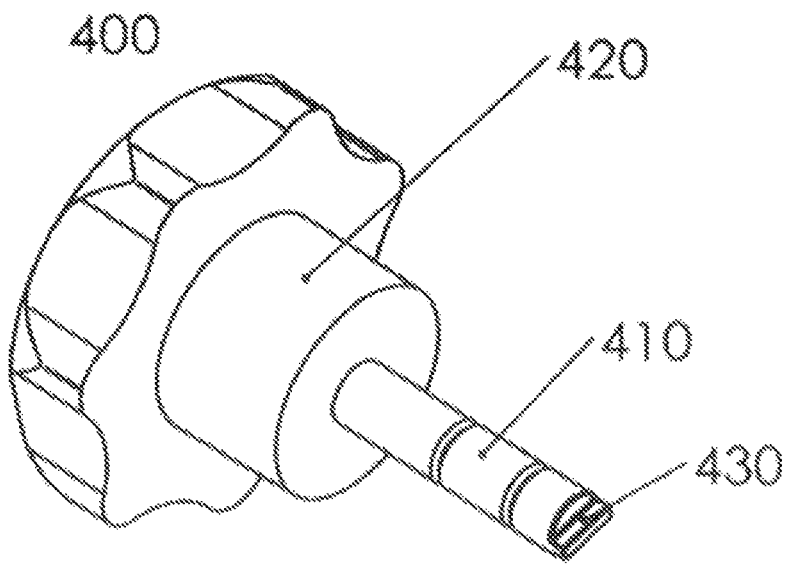
FIG. 4 is a perspective view of a tightening tool according to the disclosure, which tightens the pressure screw shown in FIG. 3.

The tightening head 332 can also have a recess 336, for example a slot, for a screwing tool 400 (cf. FIG. 4).

Advantageously, the mounting system 300 according to the disclosure can also comprise an anti-loosening screw 340 for each pressure screw 330. The system 300 can also include a protective cap 350 for each anti-loosening screw 340. The protective cap 350 can be provided with a washer 350.1 and a closure flap 350.2.

The screwing tool 400 for screwing the pressure screws 330, which tool is shown in FIG. 4, comprises a tightening rod 410 and a handle 420. The free end 430 of the tightening rod 410 has a shape that is complementary to the recess 336 provided in each pressure screw 330. In the example shown, the free end 430 has the shape of a flat blade which is complementary to the slot 336 of each pressure screw 330.

A preferred method to assemble a mount 200 by means of the detached parts of the mounting system 300 according to the disclosure will now be described.

First, the pressure screws 330 are screwed deep inside the internal threads 324 of the suspension 320. When this operation is complete, the pressure screws 330 are completely concealed in the suspension 320. The pressure screws 330 therefore do not project beyond the outer perimeter of the flanges 322. This state can be seen at the bottom of FIG. 2.

The suspension 320 is then moved into the anchoring tube 310, by introducing said suspension into the cavity 313 through the lower insertion end 312. Then the tool 400, passing through a hole 315, (cf. FIG. 2 below) unscrews each pressure screw 330 outward until the shoulder 334 of said screw bears against the anchoring tube 310. The thread 333 being left-handed, the tool 400 must be turned clockwise to move the pressure screws 330 toward the operator. At the end of this operation, the tightening heads 332 are therefore in the holes 315.

It should be noted that the six pressure screws 330 are unscrewed one after the other, then tightened in compression against the anchoring tube 310 to compensate for any clearance.

Then, preferably a cap 350 that is provided with a washer 350.1 is placed in each counterbore 315.1. An anti-loosening screw 340 can be screwed through each cap 350 and tightened in each of the pressure screws 330, preventing said pressure screws from being loosened at all.

The flaps 350.2 of the caps 350 close the counterbores 315.1, hiding the anti-loosening screws 340.

When the mount 200 is in the assembled state, the pressure screws 330 extend in particular between the bores 315.2 in the anchoring tube 310 and the internal attachment threads 324 of the flanges 322. Also, the mount 200 is able to support a weight in a stable manner in the axial/vertical direction. The weight of lighting that is hooked onto the mount 200 is applied to the anchoring tube 310 via the flanges 322 and the pressure screws 330. This also ensures lateral and rotational stability in order to prevent the suspension 320 from oscillating. The pressure screws 330 are generally compressed downward against the bores 315.2 in the anchoring tube 310 by the weight of the suspension 320, and by the weight of lighting and/or an arm of the lighting, if present.

Arrangements in which the internal threads 324 are provided on the suspension 320 in structures other than flanges 322 are also conceivable.

It should be noted that the mounting system and the mount according to the disclosure may be subject to numerous modifications without departing from the scope of the disclosure. The following modifications in particular can be considered:

the pressure screws 330 can be provided with a right-handed thread;
the tool recess of the pressure screws 330 can be varied;
the caps 350 and the anti-loosening screws 340 are optional;
a thread lock can be provided instead of an anti-loosening screw 340;
the number of pressure screws 330 can vary.

The mounting system and the mount according to the disclosure have in particular the following advantages:

owing to the compression mounting, the attachment screws are not elongated and therefore not weakened;
compression mounting also eliminates any clearance between the suspension and the anchoring tube;
providing the anti-loosening screws prevents the pressure screws being loosened at all. The maintenance which is necessary for the mount from the prior art according to FIG. 1 and which consists in retightening the attachment screws can therefore be omitted;
the protective caps prevent dirt from entering the mount, which facilitates cleaning.

Figure 5:
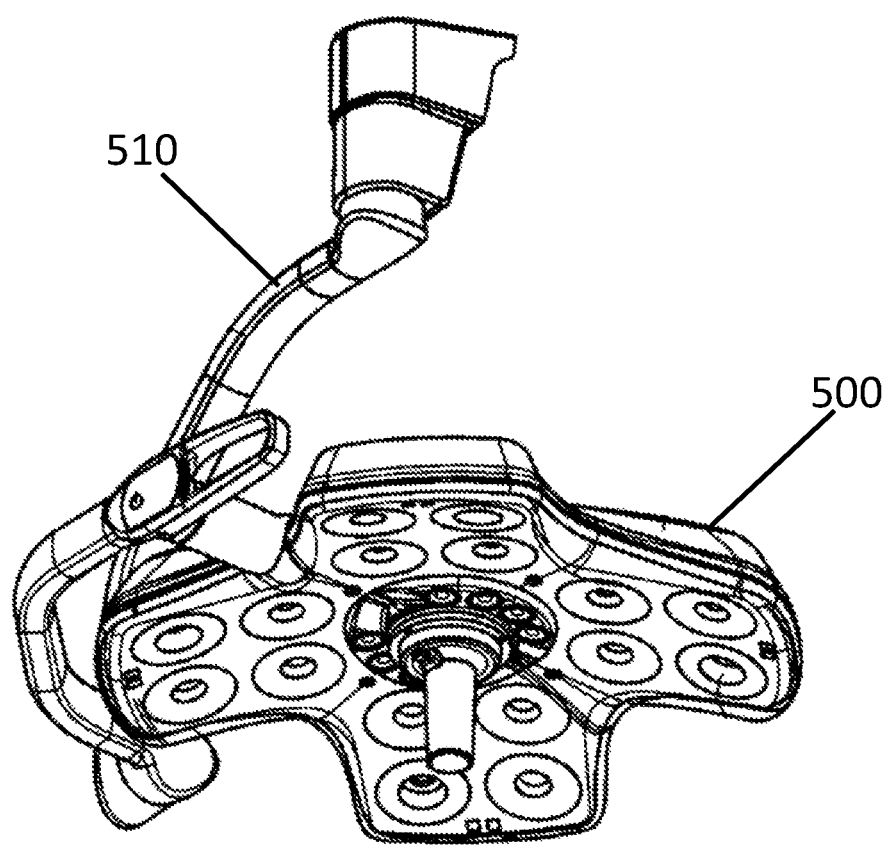
FIG. 5 is an exemplary mounted surgical light suspension including a light head and an adjustable articulated arm.

FIG. 5 is an exemplary mounted surgical light suspension including a light 500 and an articulated arm 510.

The invention claimed is:

1. A system for mounting surgical lighting to the ceiling of an operating theater, said system comprising:
    an anchoring tube for anchoring the surgical lighting to the ceiling of the operating theater, the anchoring tube comprising a plurality of attachment holes;
    a surgical lighting suspension that is suitable for supporting the surgical lighting and for being attached to the anchoring tube, the suspension comprising an attachment portion that has a plurality of internal attachment threads; and
    a plurality of attachment screws comprising a threaded body and a tightening head, each attachment screw being designed for the threaded body thereof to be screwed into one of the internal attachment threads of the surgical lighting suspension, and for the tightening head thereof to be received in one of the attachment holes of the anchoring tube,
    wherein at least some of the attachment screws are pressure screws, the pressure screws being provided in order to attach the surgical lighting suspension to the anchoring tube by means of compressive stress.

2. A mount for hooking surgical lighting onto the ceiling of an operating theater, the mount being the mounting system according to claim 1 in an assembled state:
wherein the attachment portion of the surgical lighting suspension is positioned within the anchoring tube, and attached to said tube by means of pressure screws,
wherein each pressure screw is tightened in compression against the anchoring tube.

3. Method for assembling a mount according to claim 2, comprising the steps of:
a) screwing each pressure screw inside one of the internal attachment threads of the surgical lighting suspension so as to conceal the pressure screws completely inside the surgical lighting suspension;
b) inserting the attachment portion of the surgical lighting suspension into the anchoring tube until the internal attachment threads are in line with the attachment holes;
c) engaging a screwing tool with a tightening head of a pressure screw by inserting the screwing tool into an internal attachment thread while passing through the associated attachment hole;
d) unscrewing the pressure screw by means of the screwing tool until said pressure screw bears and is compressed against the anchoring tube; and
e) repeating steps c) and d) for each pressure screw in order to compensate for any clearance between the surgical lighting suspension and the anchoring tube.

4. The method of claim 3, further comprising the step of screwing an anti-loosening screw into each pressure screw to secure the pressure screw.

5. A mount according to claim 2:
further comprising an anti-loosening screw for each pressure screw that is positioned to prevent the pressure screw from being loosened in the mounted state;
wherein each attachment hole accommodates a tightening head and an anti-loosening screw that is screwed into the tightening head.

6. A system according to claim 1, further comprising an anti-loosening screw for each pressure screw that is used to prevent the pressure screw from being loosened in the mounted state.

7. A system according to claim 6, wherein an internal thread is provided in the tightening head of each pressure screw, the internal thread being suitable for receiving one of the anti-loosening screws.

8. A system according to claim 6, further comprising a protective cap for each anti-loosening screw, the protective cap being provided with a washer and/or a flap for closing the cap.

9. A system according to claim 1:
wherein the internal attachment threads are each sized to fully receive a respective pressure screw, so that the pressure screws may be positioned completely within the internal attachment threads during installation;
wherein, in an assembled state, each pressure screw is positioned partially in an internal attachment thread of the suspension and partially in an attachment hole of the anchoring tube.

10. A system according to claim 1, wherein the diameter (d1) of the tightening head of each pressure screw is less than the diameter (d2) of the threaded body so as to define a bearing shoulder at the interface between the tightening head and the threaded body.

11. A system according to claim 1, wherein:
the surgical lighting suspension comprises an attachment shaft and a flange that is secured to and encircles the attachment shaft;
the flange comprises the plurality of internal attachment threads in respective passages that are provided in the flange, each internal attachment thread being sized to accommodate a pressure screw; and
the attachment shaft comprises an elongate pipe that is shaped for being positioned at least partially in the anchoring tube;
wherein when the attachment shaft is positioned inside the anchoring tube, there is substantially no clearance between the flange and the anchoring tube.

12. A system according to claim 1, wherein:
the suspension comprises an attachment shaft and a plurality of flanges that are secured to the attachment shaft and arranged so as to be mutually spaced along said attachment shaft; and
the flanges each comprise a plurality of internal attachment threads.

13. A system according to claim 1, wherein in an assembled state, corresponding internal attachment threads and attachment holes are aligned and have substantially no clearance between them; and
wherein all of the attachment screws are pressure screws.

14. A system according to claim 1, wherein in an assembled state:
the pressure screws are oriented radially outward relative to the surgical lighting suspension;
the pressure screws each extend between an attachment hole of the anchoring tube and an internal attachment thread of the surgical lighting suspension so that a suspension weight of the suspension at least partially hangs on the pressure screws; and
the pressure screws thus prevent lateral or rotational movement of the suspension relative to the anchoring tube, and are capable of at least partially supporting the suspension weight of surgical lighting.

15. A system according to claim 1, further comprising an anti-loosening screw for each pressure screw that is used to prevent the pressure screw from being loosened in an assembled state;
wherein each anti-loosening screw comprises:
a threaded end that is screwed into an internal thread of the corresponding pressure screw thereof so as to lock the pressure screw in position; and
a head that has a diameter larger than that of the threaded end and is positioned in a counterbore of one of the attachment holes in the anchoring tube.

16. A system according to claim 1:
wherein the suspension is connected to and supports an articulated arm and a surgical light.

17. A method for assembling a system for mounting surgical lighting to the ceiling of an operating theater, said method comprising:
providing the system, the system comprising:
an anchoring tube for anchoring the surgical lighting to the ceiling of the operating theater, the anchoring tube comprising a plurality of attachment holes;
a surgical lighting suspension that is suitable for supporting surgical lighting and for being attached to the anchoring tube, the surgical lighting suspension comprising an attachment portion that has a plurality of internal attachment threads therein for shaped for receiving entire pressure screws; and
a plurality pressure screws, each pressure screw comprising a threaded body and a tightening head, each pressure screw being designed for the threaded body thereof to be screwed into one of the internal attachment threads of the surgical lighting suspension, and for the tightening head thereof to be received in one of the attachment holes of the anchoring tube;

the method further comprising the steps of:
a) screwing each pressure screw completely inside one of the internal attachment threads of the surgical lighting suspension so as to conceal the pressure screws completely inside the surgical lighting suspension;
b) inserting the attachment portion of the surgical lighting suspension into the anchoring tube until the internal attachment threads are in line with the attachment holes;
c) partially unscrewing the pressure screws until part of each pressure screw is inside a respective attachment hole, and part of each pressure screw remains inside a respective internal attachment thread.

18. The method of claim 17, further comprising:
screwing anti-loosening screws into each of a plurality of the pressure screws to secure the pressure screws.

19. The method of claim 17:
wherein said step of partially unscrewing the pressure screws until part of each pressure screw is inside a respective attachment hole, and part of each pressure screw remains inside a respective internal attachment thread, includes moving the pressure screws radially outward with respect to the attachment portion of the surgical lighting suspension.

20. The method of claim 17:
wherein the attachment portion of the surgical lighting suspension comprises an attachment shaft and one or more flanges that are secured to and encircling the attachment shaft;
wherein the one or more flanges each has a greater diameter than the attachment shaft, and each has substantially the same diameter as an internal space of the anchoring tube; and
wherein at least some of the internal attachment threads are within the one or more flanges.

* * * * *